CONTINUOUSLY VARIABLE DIGITAL DELAY LINE

Filed May 18, 1959 9 Sheets-Sheet 1

INVENTORS
PERRY M. ROBERTS
HENRY J. WYCHORSKI
BY
[signature]
ATTORNEY

CONTINUOUSLY VARIABLE DIGITAL DELAY LINE

Filed May 18, 1959 9 Sheets-Sheet 2

INVENTOR.
PERRY M. ROBERTS
HENRY J. WYCHORSKI
BY
ATTORNEY

CONTINUOUSLY VARIABLE DIGITAL DELAY LINE

Filed May 18, 1959 9 Sheets-Sheet 3

INVENTORS
PERRY M. ROBERTS
HENRY J. WYCHORSKI
BY
ATTORNEY

CONTINUOUSLY VARIABLE DIGITAL DELAY LINE

Filed May 18, 1959 9 Sheets-Sheet 4

INVENTOR.
PERRY M. ROBERTS
HENRY J WYCHORSKI

BY [signature]

ATTORNEY

CONTINUOUSLY VARIABLE DIGITAL DELAY LINE

Filed May 18, 1959 9 Sheets-Sheet 5

INVENTORS
PERRY M. ROBERTS
HENRY J. WYCHORSKI
BY
[signature]
ATTORNEY

INVENTORS
PERRY M. ROBERTS
HENRY J. WYCHORSKI
BY [signature]
ATTORNEY

| $A_1$ | $B_1$ | C |
|---|---|---|
| 0 | 0 | 1 |
| 0 | 1 | 0 |
| 1 | 0 | 0 |
| 1 | 1 | 1 |

| CONDITION | (1) | (2) | (3) | (4) |
|---|---|---|---|---|
| LINE ONE | $A_1 B_1$ | $A'_1 B'_1$ | $A_1 B'_1$ | $A'_1 B_1$ |
| LINE ZERO | $A'_2 B'_2$ | $A_2 B_2$ | $A'_2 B_2$ | $A_2 B'_2$ |

| A | $B_1$ | $A_2$ | $B_2$ | C |
|---|---|---|---|---|
| 0 | 0 | 1 | 1 | 1 |
| 0 | 1 | 1 | 0 | 0 |
| 1 | 0 | 0 | 1 | 0 |
| 1 | 1 | 0 | 0 | 1 |

*INVENTORS*
PERRY M. ROBERTS
HENRY J. WYCHORSKI

BY [signature]

*ATTORNEY*

June 4, 1963 H. J. WYCHORSKI ET AL 3,092,808

CONTINUOUSLY VARIABLE DIGITAL DELAY LINE

Filed May 18, 1959 9 Sheets-Sheet 8

INVENTORS
PERRY M. ROBERTS
HENRY J. WYCHORSKI

BY [signature]

ATTORNEY

INVENTORS
PERRY M. ROBERTS
HENRY J. WYCHORSKI

BY [signature]
ATTORNEY

United States Patent Office 3,092,808
Patented June 4, 1963

3,092,808
CONTINUOUSLY VARIABLE DIGITAL DELAY LINE

Henry J. Wychorski, Hyattsville, and Perry M. Roberts, West Hyattsville, Md., assignors to ACF Industries, Incorporated, New York, N.Y., a corporation of New Jersey Filed May 18, 1959, Ser. No. 813,933
3 Claims. (Cl. 340—146.2)

This invention relates to pulse delay systems and, more particularly, to a circuit employing digital techniques for obtaining a wide range of pulse delay times.

In many electronic systems, it is necessary for an event or indication to occur at a precise time subsequent to some initiating event. One such need is felt in the simulation art where training in observing distances between objects is a goal of the simulation equipment. Both visual and aural indicia may be presented to a trainee to test his responses and reflexes to the information presented. In accurately accomplishing the training goal, it is required that the simulation equipment provide an accurate continuously variable delayed pulse of long delay time.

It is, therefore, the broad object of this invention to provide a delay line utilizing digital techniques.

It is another object of this invention to provide a digital delay line having an initiating pulse generator with counter and a digital range information storage register whereby comparison of the counter output with the storage register yields an output pulse delayed in time from the initiating pulse in accordance with the range storage register value.

It is a further object of the invention to provide a delay line for use in the simulation of radar equipment.

It is another object of the invention to provide a delay line for use with simulation equipment in which some indication is desired to be displayed at a time delayed from an initiating signal.

The novel features of the invention are set forth in the appended claims and the invention as to its organization and its mode of operation will best be understood from a consideration of the following detailed description of the preferred embodiment when used in connection with the accompanying drawings which are hereby made a part of the specifications, and in which:

The preferred embodiment of this invention provides apparatus capable of recognizing a digital code and providing a signal delayed in time in accordance with the digital code. Digital techniques are employed by this invention to establish an indefinitely long pulse delay line having very precise time characteristics. At present, accurate delay lines available are limited to approximately one hundred microseconds. These devices are inadequate for the simulation of radar pulse delays which exceed the time of the known delay devices by a factor of one hundred. To accurately delay a pulse for a time duration of this magnitude, a digital device is here utilized.

Figure 1:
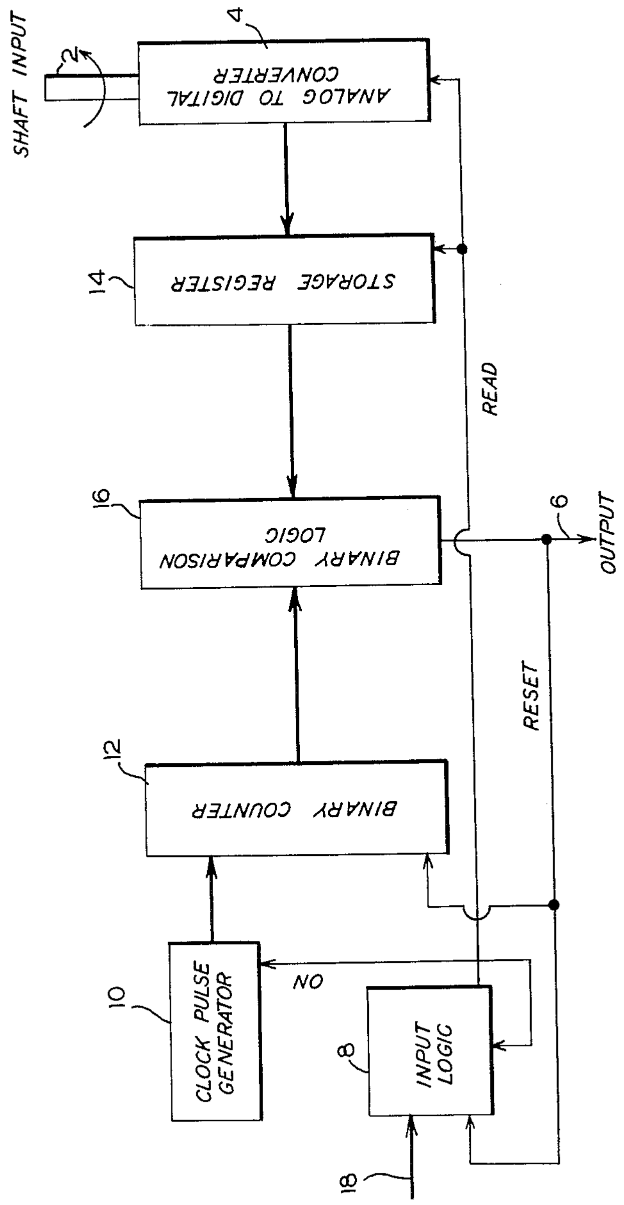
FIG. 1 is a block diagram of the digital delay line.

The radar simulator delay line, as it is illustrated in FIG. 1, can be employed as a target range generator. In such a case, the rotational position of the input shaft 2 is analagous to the range or distance between two objects. Thus, by driving the analog to digital converter 4 at any rate representing a moving target a range tracking condition may be simulated. The range information is thus converted from a shaft position analog to digital information, in the converter 4, and the delayed signal on the output conductor 6 will automatically be an indication of the range or distance between two objects.

For ease of understanding the delay line will be described by reference to FIG. 1 as comprising an input logic system 8, a clock pulse generator 10, binary counter 12, an analog to digital converter 4, a storage register 14, and a binary comparison logic circuit 16.

The operation of the delay line will be described first in general terms by reference to FIG. 1. The analog to digital converter 4 is activated continuously by the shaft 2 to convert analog range information to digital range information. The converter 4 supplies the storage register 14 with this digital range information so that at all times the range quantity is present in the storage register 14 in the form of conducting and non-conducting circuit elements or to be more precise, conductors with either voltage or no voltage on them.

The input logic system 8, in response to signals applied to its input lead 18, initiates the complete system operation. An on signal from the input logic circuit allows a train of time stabilized signals from the clock pulse generator 10 to actuate the binary counter 12. The counter 12 comprises bistable multivibrator or flip-flop circuits which provide voltage and no voltage information to the binary comparison logic circuit 16. This comparison circuit compares the voltage and no-voltage signals of the range information which appear at the storage register 14 with the voltage and no-voltage signals of the binary counter 12 and when there is coincidence on all compared conductors the comparison logic circuit allows an output signal to be generated. The initiating input pulse causes an output signal to occur at a time which is equal to the time between the pulses of the clock pulse generator multiplied by the number of pulses which occur between the on pulse to the clock pulse generator and the point where the counter register coincides with the storage register so as to allow the comparison logic circuit to generate its pulse.

To reiterate, the input logic system 8 governs or initiates the complete system operation. The delaying action required is stepped off in time segments by the clock pulse generator 10 and binary counter 12. The analog to digital converter 4 and storage register 14 indicate to the binary counting register 12, through the comparison logic circuit 16, the precise time delay desired. One cycle is completed when the binary comparison logic circuit 16 yields a single useful output upon completion of the proper binary count as indicated by the storage register.

Figure 2:
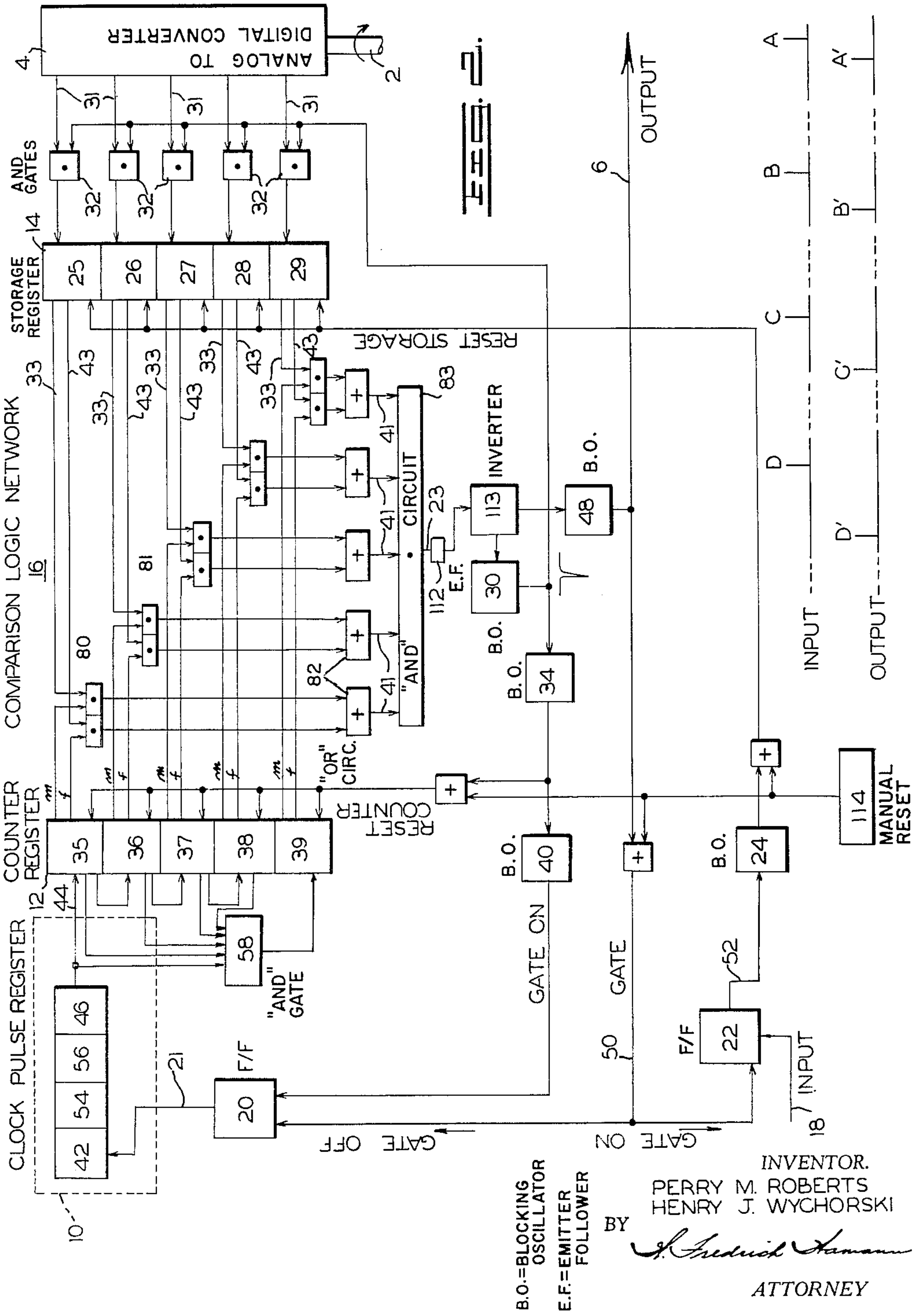
FIG. 2 is a more detailed block diagram of the digital delay line.
Figure 13:
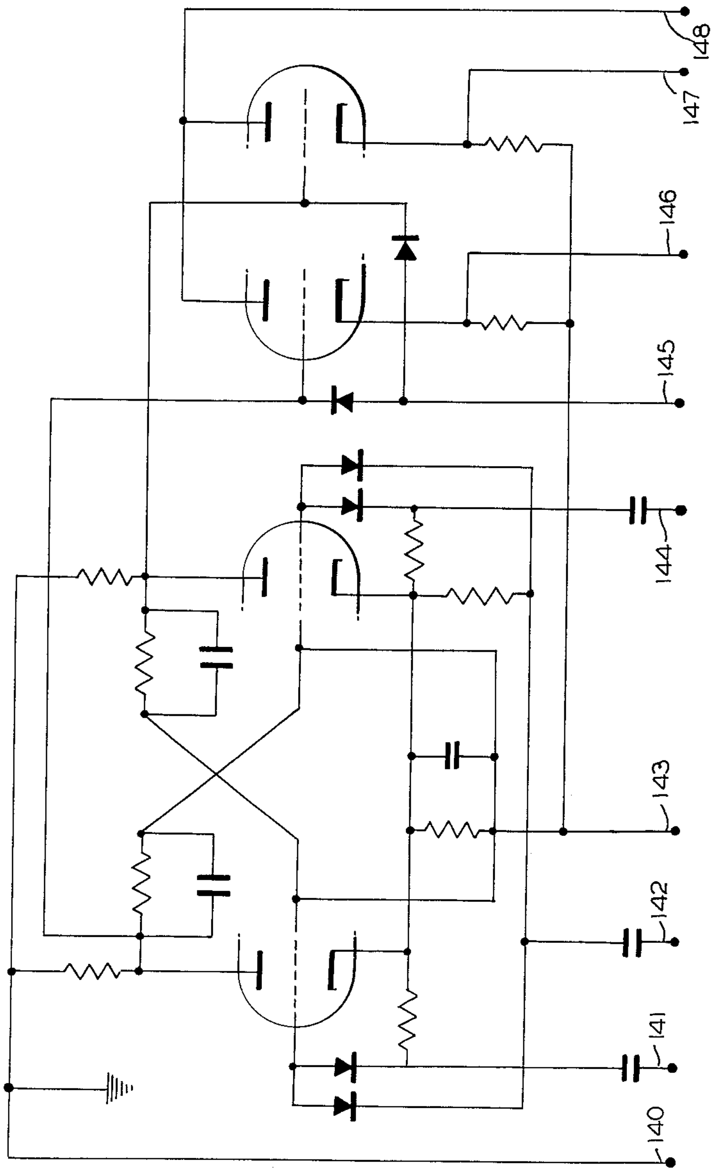
FIG. 13 is a schematic of a typical flip-flop circuit.

To describe the operation of the delay line in greater detail, reference should be made to FIGS. 1 and 2. Both the counter and storage registers, which comprise bistable flip-flop circuits, are set to a zero reference operating condition to satisfy the initial starting conditions. One example of a flip-flop circuit which may be employed is shown in FIG. 13, as described hereinafter.

When the initial pulse is introduced on conductor 18 into the input logic system 8, a trigger "on" pulse is introduced into the clock pulse generator 10. The clock is triggered on only if the following conditions are satisfied: a trigger "on" pulse will be obtained when the storage register 14 has been changed from the previous counter to storage register comparison. At time $t=0$, however, to yield a comparison, both the counter and storage registers are set to zero to satisfy the initial starting conditions. Upon initiation of the clock pulse generator, a serial chain of pulses is introduced into the binary counter 12. This register yields a parallel binary count required by the comparison logic network 16. When a comparison is achieved, between the counter and storage register, a single output pulse emerges from the comparison logic which is both a useful output and the stop pulse for the clock pulse generator. The system remains inoperative until receipt of the next sampling pulse into the input logic network.

FIG. 2 illustrates a detailed block diagram for the digital delay line. Although this diagram is drawn for a storage capacity of 32, this in no way is suggested as a limitation of the equipment, but can be extended to include a much greater capacity.

Referring now to the input logic system, once the initiating condition, time $t=0$, outlined above has been completed, the input logic is strictly a function of the input pulses. The explanation of the operational cycle commences upon receipt of an input pulse. Prior to receipt of the input pulse, control gate number one, 20, is in the "Off" condition, zero volts D.C. at conductor 21 and control gate number two, 22, is in a set state —20 v. D.C. at conductor 52. Also at this time a comparison exists in the comparison logic network whereby the voltage level of the comparison "and" gate at junction 23 is at —20 v. D.C. with control gate 22 set, the next input pulse resets the flip-flop 22, thereby triggering blocking oscillator 24, the output of which is employed to set the storage register to zero. One example of a blocking oscillator circuit which may be used is illustrated on page 46–2 of Handbook of Preferred Circuits NAVAER 16–1–519 of the National Bureau of Standards. In this condition, the output conductors 43 carry a potential of —20 volts D.C. while conductors 33 carry a potential of zero volts for flip-flops 25 through 29. The resetting of the storage register to zero, by the blocking oscillator or by the initial and manual reset knob 114, eliminates the comparison between the storage and counter registers and results in the following sequence of events. The level of the output diode comparison logic at junction 23 is returned to a zero D.C. level. This change in level from a negative voltage to zero voltage triggers blocking oscillator 30 which emits a pulse that is employed to satisfy the five "and" gates 32 on each of the lines from the analog to digital converter. These "and" gates are so set up that whenever a —20 v. D.C. potential is available on any of the five lines ($e$) the output pulse from blocking oscillator 30 is allowed to pass through the "and" gates 32 and triggers the corresponding flip-flop. In effect, the pulse from blocking oscillator 30 permits the binary number representing a range position to be stored in the flip-flop register 25 through 29. The fall time from the pulse emitted from blocking oscillator 30 is employed to trigger blocking oscillator 34. The output pulse resets the counter register 12, made up of flip-flops 35 through 39. In doing this, the output line ($f$) of each flip-flop is returned to zero potential while line ($m$) carries —20 v. D.C. The output pulse of blocking oscillator 34 also triggers control blocking oscillator 40 which returns the output conductor 21 to —20 volts, which in turn gates the oscillator 42. This allows the clock pulses at conductor 44 to be formed by blocking oscillator 46 and enter the counter register 12. When a comparison exists between the counter and storage register the output level of the "and" comparison diode logic at junction 23 is changed from a zero to a minus 20 volts D.C. The change to a minus level triggers oscillator 48, the output pulse on conductor 6 representing the delay pulse. The pulse from oscillator 48 which appears on conductor 50 is employed to trigger control gate 20 off and set gate 22 to a —20 volts output at conductor 52. With control gate 20 off, the clock pulses are prevented from entering the counter 12. Control gate 22 "set" allows the next input pulse to trigger blocking oscillator 24 and the cycle is repeated.

The clock pulse generator 10 utilizes a gated sine wave oscillator 42. The output of the oscillator 42 is amplified and squared by amplifier 54, squared by squaring circuit 56 and then used to trigger blocking oscillator 46. An example of such a squaring circuit may be found in Figure 2–11 on page 39 of Pulse and Digital Circuits, by Millman and Taub, published by McGraw-Hill. The result is a minus 20 volt one microsecond pulse on conductor 44 having a particular clock pulse repetition rate. The output at 44 of blocking oscillator 46 is a function of control gate 20. When the pulses are formed they trigger the first flip-flop 35 of the counter register 12, which in turn triggers the second, etc. The net result is to yield a count of the clock pulses in parallel form on conductors $m$ and $f$ of each of the five flip-flops 35 through 39. "And" gate 58 serves as a high speed carry logic to reduce the inherent delay in the counter.

The analog to digital converter is a standard type yielding a binary representing an angular rotation. The output of the five lines 31 are then introduced into the five "and" gates 32. The output of the five "and" gates then trigger the corresponding flip-flop to yield either zero or a minus twenty volts D.C. on lines 33 or 43.

The binary logic is so set up that the corresponding lines of the counter and storage register are compared, i.e., line ($m$) of counter flip-flop 35 is compared to line 33 of the storage flip-flop 25; line ($f$) of counter flip-flop 35 to line 43 of storage flip-flop 25; etc., until all ten outputs are compared. When a comparison exists in the diode logic circuit, i.e., when an output is available from each line 41 the output level of the comparison logic at point 23 goes negative to minus 20 volts. This level will remain until the storage register is reset to zero eliminating the comparison. The output of the diode logic was discussed previously in the operation of the input logic. Junction 23 is connected to emitter follower 112 which is of the type shown in "Transistor I" by RCA Laboratories, New Jersey, on page 617, Figure 5. Its function is merely to act as isolation stage for impedance matching. This stage, in turn, feeds the linear inverter amplifier 113 which is of the type shown in Figures 12–18 on page 279 of Television Servicing, by Solomon Hiller.

Figure 4:
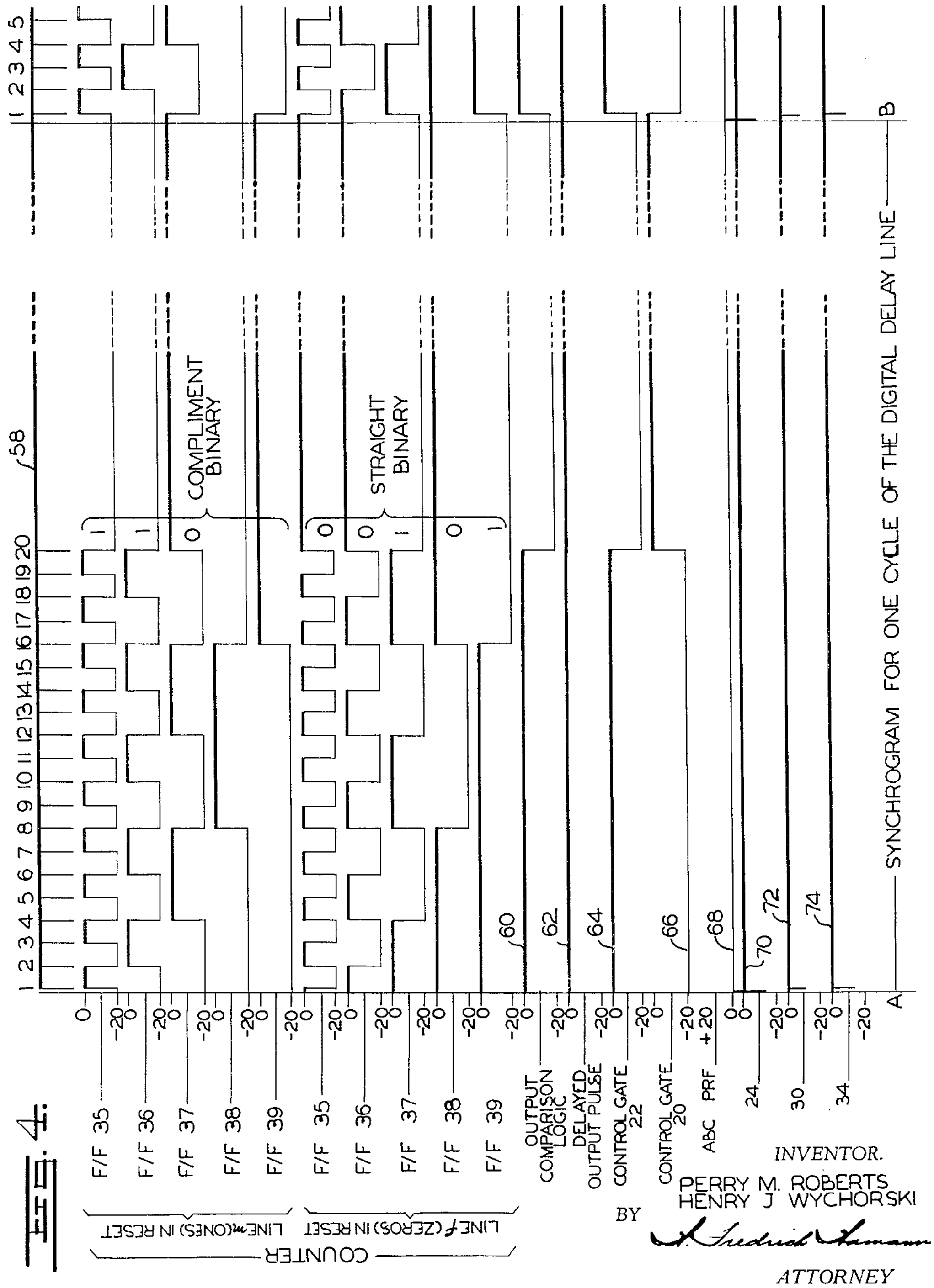
FIG. 4 is a synchrogram of one count cycle of the digital delay line.

FIG. 4 illustrates a cycle in the digital delay line through the use of a synchrogram for the binary number 10100. It indicates the various voltage levels of the component parts during the initiating, counting, comparison and final output process. The first line indicates the clock pulse generator output, while the succeeding ten lines illustrate the two output lines of each flip-flop 35 through 39 of the counter register. When the voltage levels of the counter compares to the level stored in flip-flops 25 through 29, the output of the comparison logic is as shown in line 60. Line 62 indicates the delayed output pulse, while lines 64 and 66 show the reset of control gates 22 and 20 resulting from the comparison. The gates being so set as to accept the next A, B, C, etc., pulse line 68. Line 70 shows the result of the initiating A, B, C, etc., pulse resetting of the storage register to the zero state, blocking oscillator 24, and the subsequent triggering of delay blocking oscillator 30, shown as line 72 and oscillator 34 shown as line 74, resulting in the introduction of information in the storage register and the resetting of the counter. FIG. 2 contains a synchrogram of just the input and output information, i.e., a pulse is introduced in the digital delay line and at time A the output pulse is made available. The system is continuous such that B pulse would be delayed and yield a B′ pulse.

The comparison of the counter and the storage register is accomplished when the initial bit, the least significant and the succeeding bits of the counter register are compared. In order to understand the comparison logic only the initial of bits of flip-flop 35 and flip-flop 25 of the comparison logic will be cited in the following example since all succeeding comparisons are identical. This circuit will be developed through Boolean terms. To develop the comparison logic from the ones in the first set of flip-flops, the following condition exists when both flip-flops are in reset condition:

(1) $$A_1B_1=1$$

(2) $$A'_1B'_1=0$$

(3) $$A_2=A'_1 \text{ and } B_2=B'_1$$

Figures 7, 8, 9, 10:
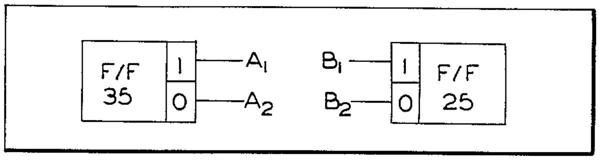
FIG. 7 illustrates the flip-flop reset condition.
FIG. 8 illustrates the binary comparison.
FIG. 9 illustrates a Boolean relation.
FIG. 10 illustrates the relationship of comparative binary count.

Referring to FIG. 7, both functions cannot exist on a single comparative line at the same time, therefore:

(4) $$A_1B_1+A'_1B'_1$$

would give the binary comparison. In order to satisfy the conditions of binary comparison between two flip-flops, all existing combinations must be examined.

Referring to the table of FIG. 8, where C is the binary comparison, the normal "and" gate performance results in the following:

$$A'_1B'_1=0,\ A'_1B_1=0,\ A_1B'_1=0,\ A_1B_1=1$$

This indicates there would be an ambiguous count using a single comparison line from each flip-flop, (F/F) i.e., no output would occur on a comparison of zeros. Therefore, some method must be employed to eliminate the ambiguity. In this presentation, however, only one method will be treated. If two lines are taken from each flip-flop (zero and one's) a Boolean relation can be set up as shown in the table of FIG. 9. Ambiguity can be eliminated by employing only conditions (1) and (2). Conditions (1) and (2) yield an input while no output is obtained from (3) and (4). The relationship of comparative binary count is expressed in the table of FIG. 10 where column (*c*) is the useful output. From FIG. 10 it is apparent the Boolean expression required to yield a useful output is:

$$C=A_2B_2+A_1B_1$$

No output will exist for any other combination. The logic building blocks for the above equation are composed of two "ands" and a single "or" circuit. It follows that all other bits from succeeding flip-flops will require duplicate circuits. Since a comparison of the entire binary number is required, an additional circuit is needed in the first output. Expressing the total logic in Boolean terms for individual flip-flops:

$$(A_1B_1+A_2B_2)\ ;\ (A_3B_3+A_4B_4)\ ;\ (A_5B_5+A_6B_6\ (\quad)\ -\ -\ -\ -\ -\ -\ -\ -\ (A_iB_i+A_jB_j)$$

The complete expression of the comparison is as follows:

$$R_0=(A_1B_1+A_2B_2)\ (A_3B_3+A_4B_4)\ (A_5B_5+A_6B_0)\ (\quad)\ -\ -\ -\ -\ -\ -\ -\ -\ (A_9B_9+A_{10}B_{10})$$

Figure 3:
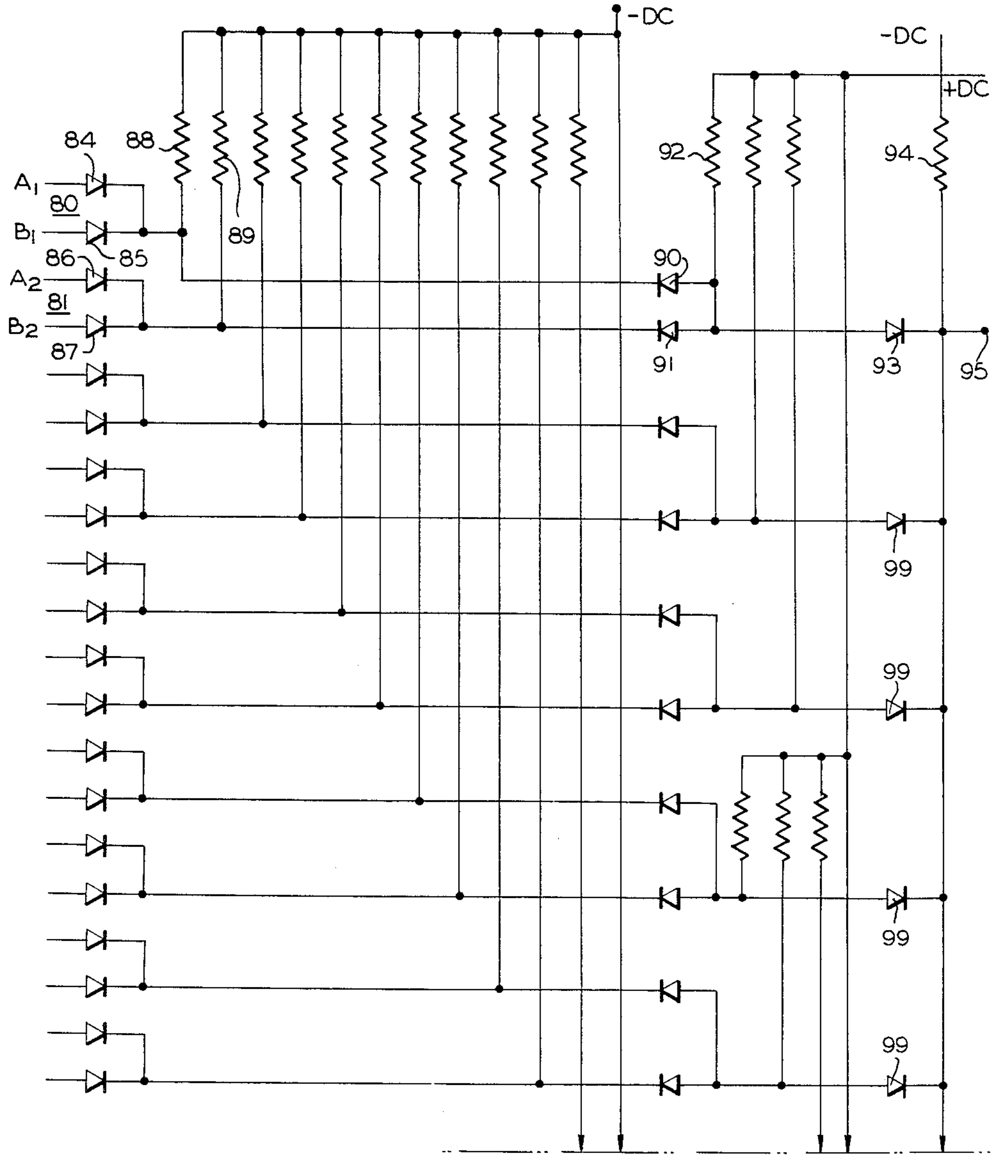
FIG. 3 is a schematic diagram of the comparison logic network of the preferred embodiment.

FIG. 3 is a detailed schematic of the binary comparison logic circuit of FIGS. 1 and 2. The signals to be compared are applied to the diodes of the "and" circuits 80, 81 of which diodes 84 and 85 are one example. One "or" circuit includes diodes 90 and 91 and the diode 93 represents one portion of the "and" circuit 83. The operation of these circuits may be followed more easily by reference to FIGS. 11 and 12.

Figure 11:
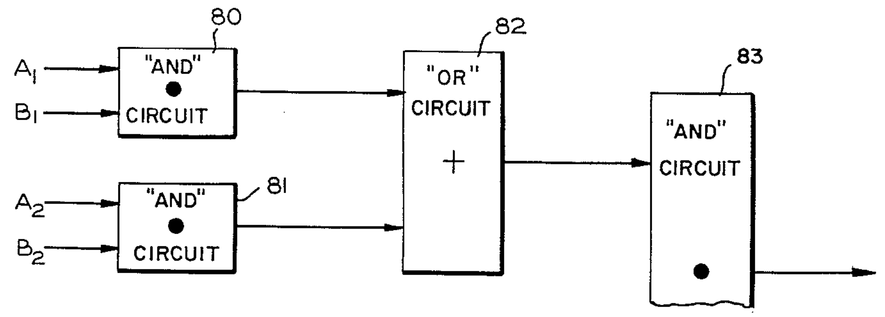
FIG. 11 is a block diagram representation of one diode comparison logic circuit of FIG. 2.
Figure 12:
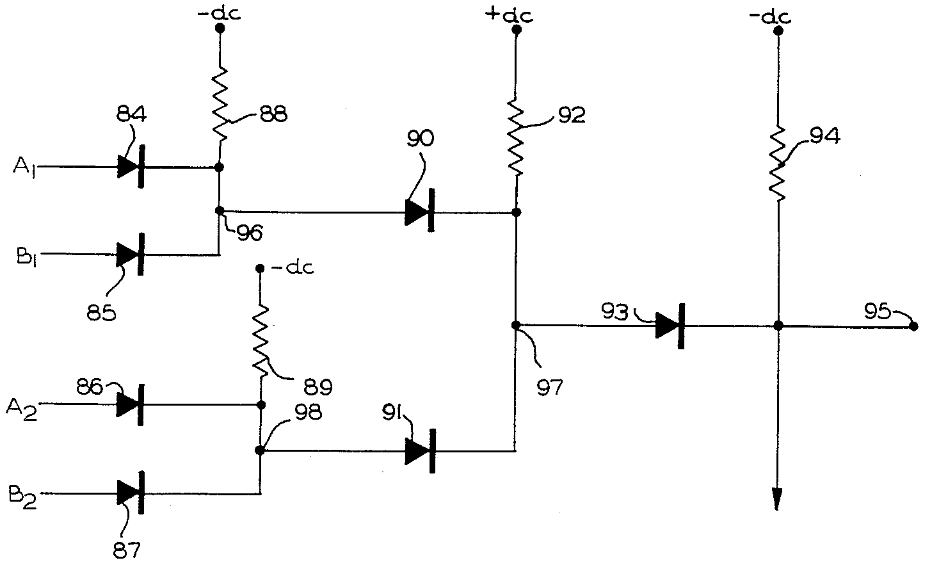
FIG. 12 is a schematic diagram of the diode comparison logic of FIG. 7.

FIG. 11 shows the and-or-and arrangement in block diagram form while FIG. 12 illustrates their operation in more detail. Assuming the $A_1$ and $A_2$ conductors to carry the outputs of flip-flop 35 and that the $B_1$ and $B_2$ conductors carry the outputs of flip-flop 25 the potential level at junction 96 will depend upon the potentials existing on leads $A_1$ and $B_1$. If the potential on either $A_1$ or $B_1$ is zero volts, conduction of diodes 84 or 85 will establish junction 96 at the zero reference since that point is returned through impedance 88 to a negative voltage. The preferred embodiment utilized a value of minus 100 volts D.C. and impedances 88 and 89 of 56K though the values are not critical. If both $A_1$ and $B_1$ drop to a negative twenty volts D.C., that level will be established at junction 96. Thus, it requires both $A_1$ and $B_1$ to alter the junction 96 D.C. level to indicate the comparison of the two voltages present on $A_1$ and $B_1$.

The "or" circuit 82 merely comprises a diode arrangement for allowing the passage of a negative voltage from either junction 96 or 98, the diodes serving as isolation means. The output of junction is then conducted to one diode 93 of the "and" circuit 83. An output is then presented at terminal 95 if a negative coincidence signal occurs simultaneously at diode 93 and the other equivalent diodes 99, as indicated in FIG. 3. In the preferred embodiment, impedance 92 of 100K ohms is returned to a +100 v. D.C. and impedance 94 of 220K ohms is returned to a −100 v. D.C. The diodes utilized were of the 1N91 type.

The accuracy of the system is contingent upon the clock PRF of the clock pulse generator, the sampling rate of the delay line, and the response of the system in which the delay line is to be employed. In general, the following inequality holds true. Clock pulse repetition rate is much larger than sampling rate which, in turn, is much larger than the response of the system. The clock PRF rate specifies the coarseness of the count and should be established on the basis of the response of the system in which the delay line is to be employed. The clock PRF rate chosen will directly affect the cost of the delay line; the higher the clock PRF rate, the more costly and complex the delay will be. For the greatest accuracy, it is desirable to make the clock PRF rate as high as possible. The clock PRF rate, however, is limited at the high frequency end by the response of the counter register, the comparison logic, and the input logic system.

The limiting characteristic governing the counter is approached when the time required to switch all the component parts of the counter register simultaneously approaches the period of the clock PRF rate. When this time is exceeded, an ambigious count results. This effect can be minimized, however, by employing an input switching logic circuit to the counter.

The recovery time in the diode comparison logic system necessarily determines the clock PRF rate. When the recovery time of the diodes employed in the logic circuit approaches the period of the clock PRF rate an ambigious count results. The greatest inaccuracy will occur, as in most time systems, as the delay time approaches time $t=0$, since the clock PRF rate required would have to be infinite and the response of the system instantaneous. The rate at which a sample is required is determined by the analog-to-digital converter. Since the device is electro-mechanical, its response is limited to lower frequencies. Loss of information will occur when the delay time approaches the period, or multiples of the period, of the sampling rate. The adaptability of the aforementioned device to other uses can be accomplished when certain modifications are performed.

One such adaptation is that of providing a variable pulse repetition rate or dividing network. When the counter is allowed to run continually the output pulse rate will have a repetition rate according to the digital code set in. The clock frequency will be divided by the amount corresponding to the coded digital number set in. By employing this method the clock frequency can be altered in integer steps of the basic frequency.

The accuracy of such a system will necessarily depend on the basic frequency. The greatest accuracy occurring when the output frequency required approaches the input clock frequency. This is especially true when the basic frequency is a high repetition rate such that the delay and storage times of the component counters and logic network must be considered in the design characteristics.

Figure 6:
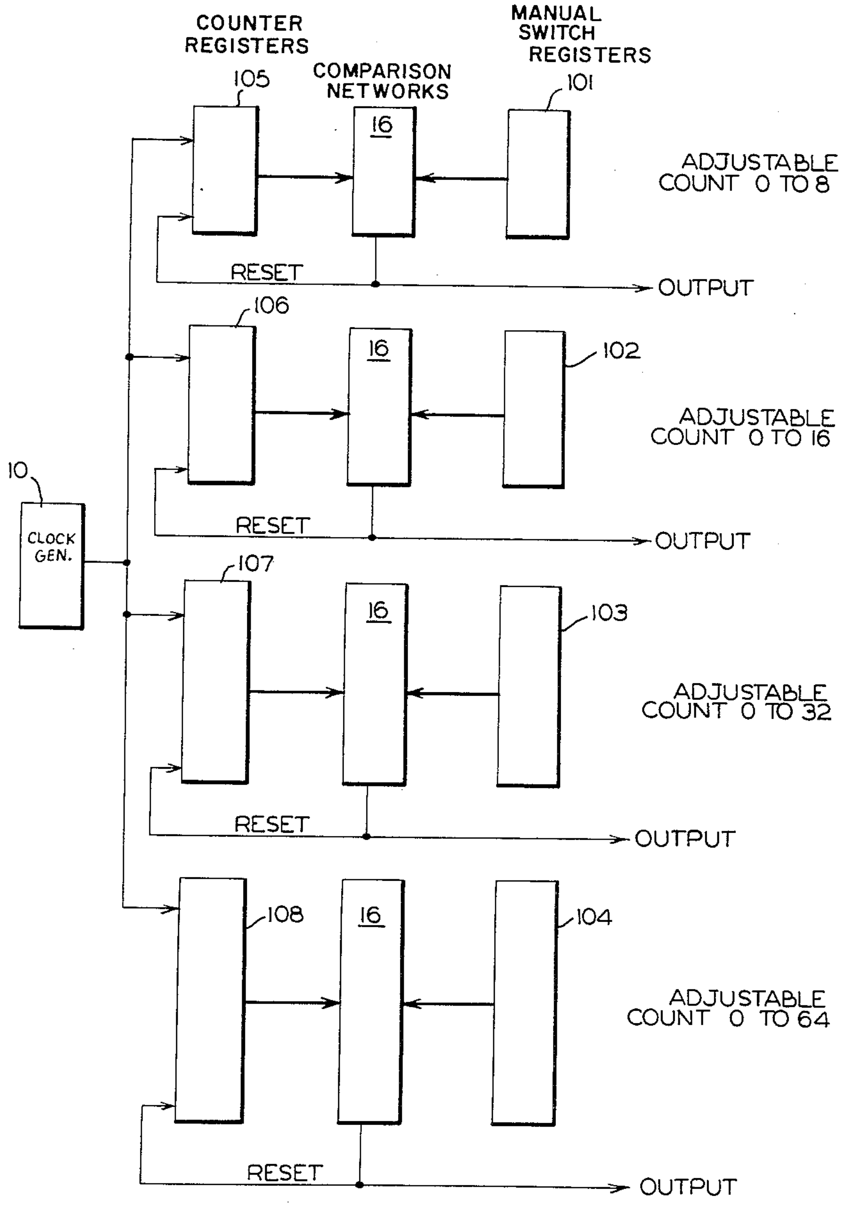
FIG. 6 is a block diagram of a multi-channel pulse generator embodiment of the invention.

One variation of the invention is capable of operating as a multi-channel pulse generator. At times it becomes a requirement to have several pulse generators operating at different repetition rates synchronized with each other. This can be accomplished by allowing the basic pulse generator to feed the counters of all the channels as shown in FIG. 6. In FIG. 6 the storage register is replaced by the manual switches 101, 102, 103 and 104 which are adjustable respectively over a count range of 0 to 8; 0 to 16; 0 to 32; and 0 to 64 counts. The counter registers, 105, 106, 107 and 108 are also capable of handling respectively the count ranges 0–8; 0–16; 0–32; and 0–64. The comparison logic circuits 16 perform the same function described previously.

Figure 5:
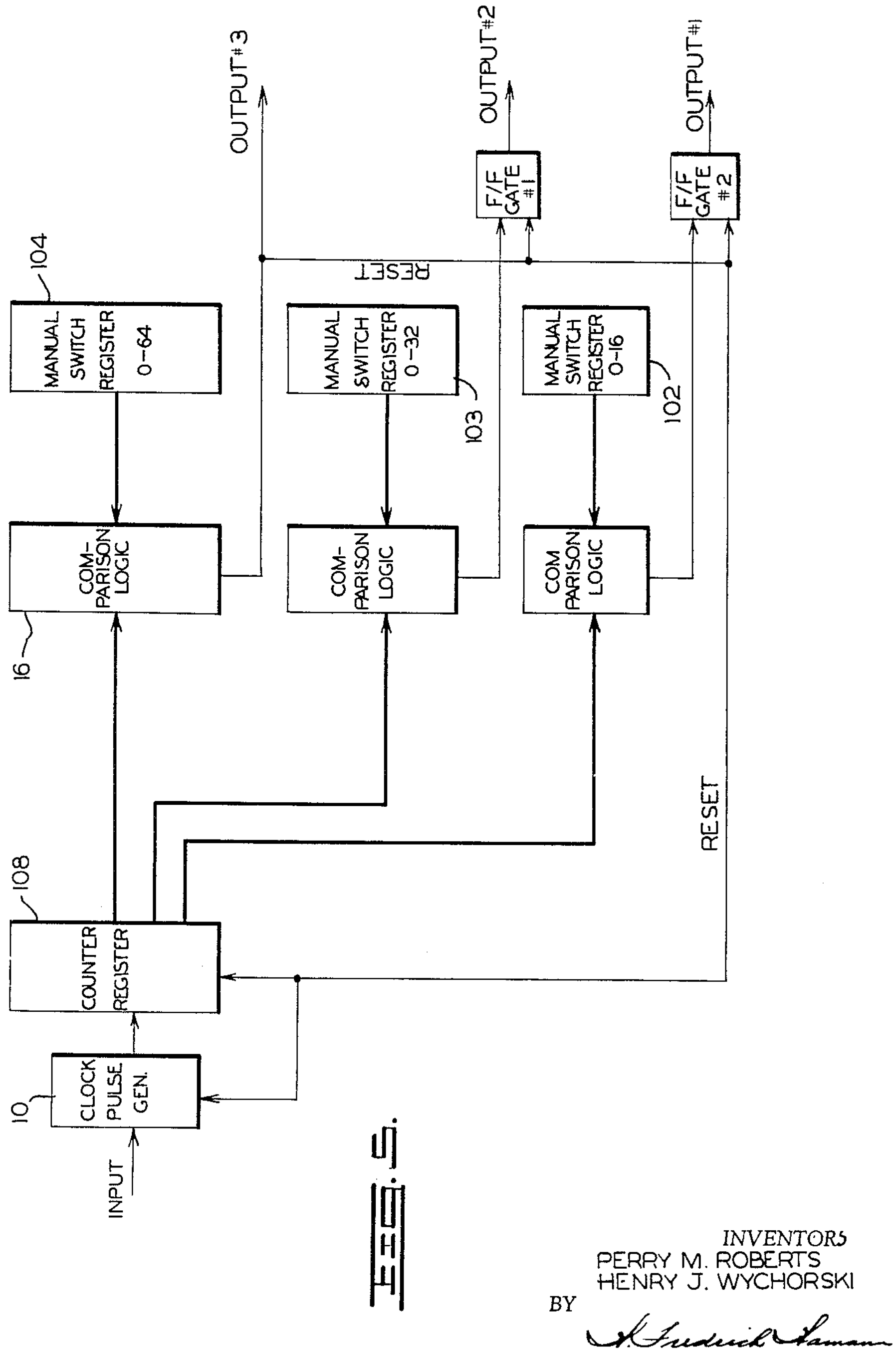
FIG. 5 is a block diagram of a synchronized parallel pulse output embodiment of the invention.

A variation which yields synchronized parallel pulse outputs is shown in FIG. 5 which illustrates a method for obtaining separate pulses synchronized with the initial trigger pulse. By combining the outputs a single coded output of several pulses may be obtained. The initial trigger pulse starts the pulse generator and activates the counter. When the counter output is equal to the preset digital value, a single pulse is emitted from the output. The output of the counter can be compared to other preset values such that more than one pulse can be obtained. The only requirement is that the pulse of the succeeding preset lines must be of a duration less than the largest preset value of the counter reset pulse. The pulse output of the largest duration pulse resets the counter and pulse generator. In order to prevent ambiguity in the short duration pulses the output line in each case has a bistable flip-flop which deactivates the circuit immediately upon receiving an output pulse. The largest duration output pulse reactivates the circuit such that an output is again permitted. In FIG. 5 the counter register 108 signals are compared with those emanating from the manual switches 104, 103 and 102 which have adjustable count ranges respectively of 0–64; 0–32; and 0–16 counts. Here again the comparison logic circuits 16 perform the function described previously.

Any one of several standard flip-flop circuits may be used with this invention, one form of which is described below. In FIG. 13 one type 5965 vacuum tube is used as the bistable multivibrator or flip-flop staged and another tube of the same type is used for the cathode follower output stages. The tube plates are returned to ground potential through conductor 140 while the cathodes are returned to a negative 100 volts D.C. by lead 143. A trigger input to conductor 142 will flip the flip-flop to the opposite state of conduction since it is applied to both multivibrator grids. A set input may be applied to conductor 141 to establish the conduction of one triode segment while a reset input applied to conductor 144 will establish conduction of the other triode segment. A positive one hundred volts D.C. is applied to conductor 148 for plate voltage for the cathode follower output stages while conductors 146 and 147 carry the output potentials of either zero or minus twenty volts, depending on which triode segment of the flip-flop circuit is conducting.

It should be understood that this invention is not limited to specific details of construction and arrangement thereof herein illustrated, and that changes and modifications may occur to one skilled in the art without departing from the spirit of the invention; the scope of the invention being set forth in the following claims.

What is claimed is:

1. Delay line apparatus for providing variably delayed output pulses, comprising input logic means, clock pulse generator means responsive to the said input logic means for generating a train of equispaced electrical signals in which the time between signals represents the time segments which make up the total time delay of the delay line, counter register means responsive to the said clock pulse generator means for counting the electrical signals emanating from the clock pulse generator and for generating binary signals representative of the signals counted, analog to digital converter means for generating digital information representive of a variable analog quantity, storage register means responsive to the said converter means for storing the said digital information and providing binary signals representative of the stored digital information, comparison logic means responsive to the signals from the said counter register means and the said storage register means for generating an output signal upon the occurrence of similar signals from the counter and storage registers, means for supplying input pulses, means responsive to said input pulses for resetting said counter register means and said storage register means and initiating operation of said clock pulse generator means, and means responsive to said output signal for stopping the operation of the clock pulse generator, whereby the output signals have delays relative to the input pulses corresponding to the values of said analog quantity.

2. A delay line comprising a first blocking oscillator and a second blocking oscillator, an analog-to-digital converter responsive to said first blocking oscillator, a clock pulse generator responsive to said second blocking oscillator, a storage register coupled to said analog-to-digital converter for storing information representative of the distance between two objects, a counter register coupled to said clock pulse generator for recording the number of pulses generated by said clock pulse generator, a diode comparison logic network coupled to said counter register and said storage register for indicating when the count in said registers coincide, and means for triggering said blocking oscillators in response to the output of said logic network.

3. A delay line comprising a first pulse generator and a second pulses generator, a storage register, an analog-to-digital converter, a plurality of "and" gates coupled between said storage register and said converter and responsive to said first pulse generator, a counter register, a clock pulse generator, said counter register being coupled to said clock pulse generator for recording the number of pulses generated by said clock pulse generator, said second pulse generator coupled to said counter register to reset said register and to said clock pulse generator for commencing operation, a diode comparison logic network coupled to said counter register and said storage register for receiving outputs therefrom, indicating means coupled to said diode network for indicating when a comparison of said counter register and said storage register exist, and means connected to the output of the indicating means for triggering said pulse generators and for resetting said storage register after an indication to said indicating means that a comparison is present.

References Cited in the file of this patent

UNITED STATES PATENTS

| | | |
|---|---|---|
| 2,422,698 | Miller | June 24, 1947 |
| 2,433,385 | Miller | Dec. 30, 1947 |
| 2,519,184 | Grosdoff | Apr. 5, 1950 |
| 2,792,545 | Kamm | May 14, 1957 |
| 2,827,623 | Ainsworth | Mar. 18, 1958 |
| 2,873,439 | Lahti | Feb. 10, 1959 |
| 2,907,021 | Woods | Sept. 29, 1959 |
| 2,909,769 | Spaulding | Oct. 20, 1959 |
| 2,957,945 | Packard | Oct. 25, 1960 |